(12) United States Patent
Takemoto et al.

(10) Patent No.: US 7,599,608 B2
(45) Date of Patent: Oct. 6, 2009

(54) INFORMATION RECORDER

(75) Inventors: Shinji Takemoto, Katano (JP); Akiyuki Noda, Shijonawate (JP)

(73) Assignee: Panasonic Corporation, Osaka (JP)

( * ) Notice: Subject to any disclaimer, the term of this patent is extended or adjusted under 35 U.S.C. 154(b) by 870 days.

(21) Appl. No.: 10/496,070

(22) PCT Filed: Oct. 18, 2002

(86) PCT No.: PCT/JP02/10857

§ 371 (c)(1),
(2), (4) Date: May 20, 2004

(87) PCT Pub. No.: WO03/045052

PCT Pub. Date: May 30, 2003

(65) Prior Publication Data

US 2005/0036766 A1    Feb. 17, 2005

(30) Foreign Application Priority Data

Nov. 20, 2001   (JP)   ............................. 2001-354280

(51) Int. Cl.
*H04N 7/26*    (2006.01)
*H04N 5/91*    (2006.01)
(52) U.S. Cl. ........................................ 386/124; 386/46
(58) Field of Classification Search ................ 386/46
See application file for complete search history.

(56) References Cited

U.S. PATENT DOCUMENTS

| | | | |
|---|---|---|---|
| 4,347,608 A | 8/1982 | Appiano et al. | |
| 4,531,198 A * | 7/1985 | Matsuda | 714/23 |
| 5,331,616 A | 7/1994 | Morita et al. | |
| 5,671,009 A * | 9/1997 | Chun | 348/153 |
| 5,724,240 A | 3/1998 | Yoon | |
| 2002/0025172 A1* | 2/2002 | Tsuda et al. | 399/8 |
| 2003/0142955 A1* | 7/2003 | Hashizume et al. | 386/52 |

FOREIGN PATENT DOCUMENTS

| | | |
|---|---|---|
| JP | 5-281291 A | 10/1993 |
| JP | 7-306712 A | 11/1995 |
| JP | 8-35889 A | 2/1996 |
| JP | 8-331593 A | 12/1996 |
| JP | 10-13790 A | 1/1997 |
| JP | 9-261583 A | 10/1997 |
| JP | 10-202726 A | 8/1998 |

OTHER PUBLICATIONS

European Search Report issued in European Patent Application No. EP 02 777 890, mailed Nov. 11, 2008.

* cited by examiner

*Primary Examiner*—Marsha D Banks Harold
*Assistant Examiner*—Oluwaseun A Adegeye
(74) *Attorney, Agent, or Firm*—McDermott Will & Emery LLP

(57) ABSTRACT

An information recording apparatus comprising image signal processing units for processing image signals from an image taking unit for recording with respect a magnetic tape and a microcomputer for recording, when abnormality occurs in the recording with respect to the magnetic tape due to abnormality in the image signal processing units, information relating to the recording abnormality in a blank recording region of the magnetic tape together with actual time information.

16 Claims, 2 Drawing Sheets

INFORMATION RECORDER

FIELD OF THE INVENTION

The present invention relates to an information recording apparatus capable of recording information that is image information or the like on a recording medium such as a magnetic tape, which is exemplified by a camera-built-in type VTR.

BACKGROUND OF THE PRESENT INVENTION

A camera-built-in type VTR, which is an example of an information recording apparatus is described. In the conventional method of image shooting with the camera-built-in type VTR, a user in charge of image shooting, in order to set up various functions of the camera-built-in type VTR, reads set data from a non-volatile semiconductor memory incorporated in a main body of the VTR or memory card set in the VTR main body and operates input keys provided in an image pickup unit or the like of the camera-built-in type VTR to thereby input the set data. The data read from the non-volatile semiconductor memory incorporated in the VTR main body and memory card set in the VTR main body and the set data inputted with the input keys are temporarily retained in a memory of a microcomputer in the VTR main body so that instructions are issued to signal processing units and driving units based on the set data. This is how the apparatus is set up in the conventional technology.

The image shooting in the described set up condition, however, sometimes undergoes recording abnormality when abnormal data is set or no data is set in the signal processing units due to disturbances, for example, a temporary contact failure of a connector or the like resulting from, for example, static electricity, cosmic ray, magnetic field, vibrations or the like.

In the conventional technology, means for recording such recording abnormality on a recording medium as an error information was a known art, which was, for example, disclosed in No. 2001-109030 of the Publication of Unexamined Patent Applications.

In the case of the known art, the occurrence of the recording abnormality can be identified from recorded details of the recording medium, however, there was no measure to inform when the recording abnormality occurred and in which signal processing unit it occurred.

In the conventional technology, therefore, when the recording abnormality occurred as described, there was no record on which circuit was responsible for the recording abnormality and which operation caused the abnormal set values. Because of the absence of such record, the causes were investigated based on the user's memory, which made it difficult to analyze the causes of the recording abnormality and therefore took a long time to trace them down.

It is an option to arrange an exclusive abnormality detecting means for detecting the occurrence of the recording abnormality, for example, by providing different kinds of sensors in the signal processing units or the like. However, to provide such the exclusive abnormality detecting means leads to an increase of cost, the apparatus in a larger size and more power consumption. From the aspect of the foregoing problems, it has been desirable that an information recording apparatus capable of simply detecting the recording abnormality is made available.

Therefore, a main object of the present invention is to provide an information recording apparatus capable of simply and quickly analyzing the causes of the recording abnormality in response to the occurrence of such.

DESCRIPTION OF THE INVENTION

An information recording apparatus according to the present invention comprises:

signal processing units, the signal processing units processing information signals for recording;

information recording units, the information recording units recording the processing information signals for recording on a recording medium; and a microcomputer, the microcomputer judging if the signal processing units are subjected to abnormality or already undergoing abnormality, and the microcomputer further recording information relating to the abnormality on an abnormality information recording medium together with actual time information in response to the judgment.

According to the present invention, the time of the occurrence of the recording abnormality is immediately known from the actual time of the recording-abnormality-related information recorded on the abnormality information recording medium. Further, the specifics of the recording abnormality can be known from the details of the set data and operation information, which are the causes of the recording abnormality, recorded on the abnormality information recording medium. Therefore, the details of the set data and information on any operated artificial setting device at the time of the occurrence of the recording abnormality recorded on the abnormality information recording medium can be analyzed without inquiring of a user for the usage. In this manner, the causes of the recording abnormality can be analyzed to detail in less time, thereby providing the user with quick feedback on the causes of the recording abnormality or the like and promptly responding to the needs for improvement and enhanced reliability. The analysis of the recording abnormality only requires the abnormality information recording medium dispensing with the information recording apparatus undergoing the recording abnormality itself. This enables the information recording apparatus to be advantageously utilized during the analysis.

According to a preferred embodiment of the present invention, the signal processing units process image signals as the information signals. In the case of recording an image information resulting from image shooting on a recording medium that is, for example, a video camera, the time of the occurrence of the recording abnormality is immediately known from the actual time recorded, together with the information relating to the recording abnormality, on the abnormality information recording medium. The specifics of the recording abnormality are known from the details of the set data and the information on the operated artificial information setting devices, which are the causes of the recording abnormality recorded on the abnormality information recording medium.

As a further preferred embodiment of the present invention, the microcomputer detects the causes of the recording abnormality per circuit element constituting the signal processing units and records the causes on the abnormality information recording medium.

In the foregoing configuration, the set data, which is the cause of the recording abnormality, is analyzed to find out which circuit is undergoing the recording abnormality so that it can be easily known which circuit element constituting image signal processing devices is undergoing the recording abnormality, thereby realizing the simpler and quicker analysis of the recording abnormality.

As a further preferred embodiment of the present invention, artificial setting units are comprised. The artificial setting units artificially set respective signal processing modes per circuit element of the signal processing units. Moreover, the microcomputer is configured in such manner as recording setting operation information of the artificial setting units, together with the actual operation time, on the abnormality information recording medium.

In the foregoing configuration, which operation implemented by the artificial setting units is responsible for the recording abnormality and the time of the occurrence of the abnormality can be simply and quickly known from analyzing the artificial operation causing the recording abnormality.

As a further preferred embodiment of the present invention, the microcomputer monitors a judgment based on comparison of the first mode setting signals and second mode setting signals at predetermined time intervals. The microcomputer also records the details of the mode setting signals and the setting information of the artificial setting units, which are the causes of the recording abnormality, on the abnormality information recording medium together with the actual time information.

In the foregoing configuration, the first mode setting signals are monitored at the predetermined time intervals. When the monitoring result is different to the preset second mode setting signal, it is automatically judged that the recording abnormality can occur any time or is already occurring. Then, the details of the setting data and the setting operation information at that time, which are the causes of the recording abnormality, are recorded, together with the actual time data, on the abnormality information recording medium to thereby quickly analyze the recording abnormality caused by disturbances or the like. This eliminates the installation of an exclusive abnormality monitoring circuit.

As a further preferred embodiment of the present invention, the apparatus comprises a device for indicating the state of recording abnormality when detecting the possible occurrence of the recording abnormality or the recording abnormality already occurring.

In the foregoing configuration, the recording abnormality is indicated or informed by the device so that the state of the possibly-occurring or already-occurring recording abnormality can be cancelled to thereby prompt timely reset to an initial mode state. In this manner, the apparatus can be arranged in such manner that the state of recording abnormality cannot continue at length. Further, the user can be previously informed that the recording medium implementing the recording is undergoing the recording abnormality.

DESCRIPTION OF THE PREFERRED EMBODIMENTS

Figure 1:
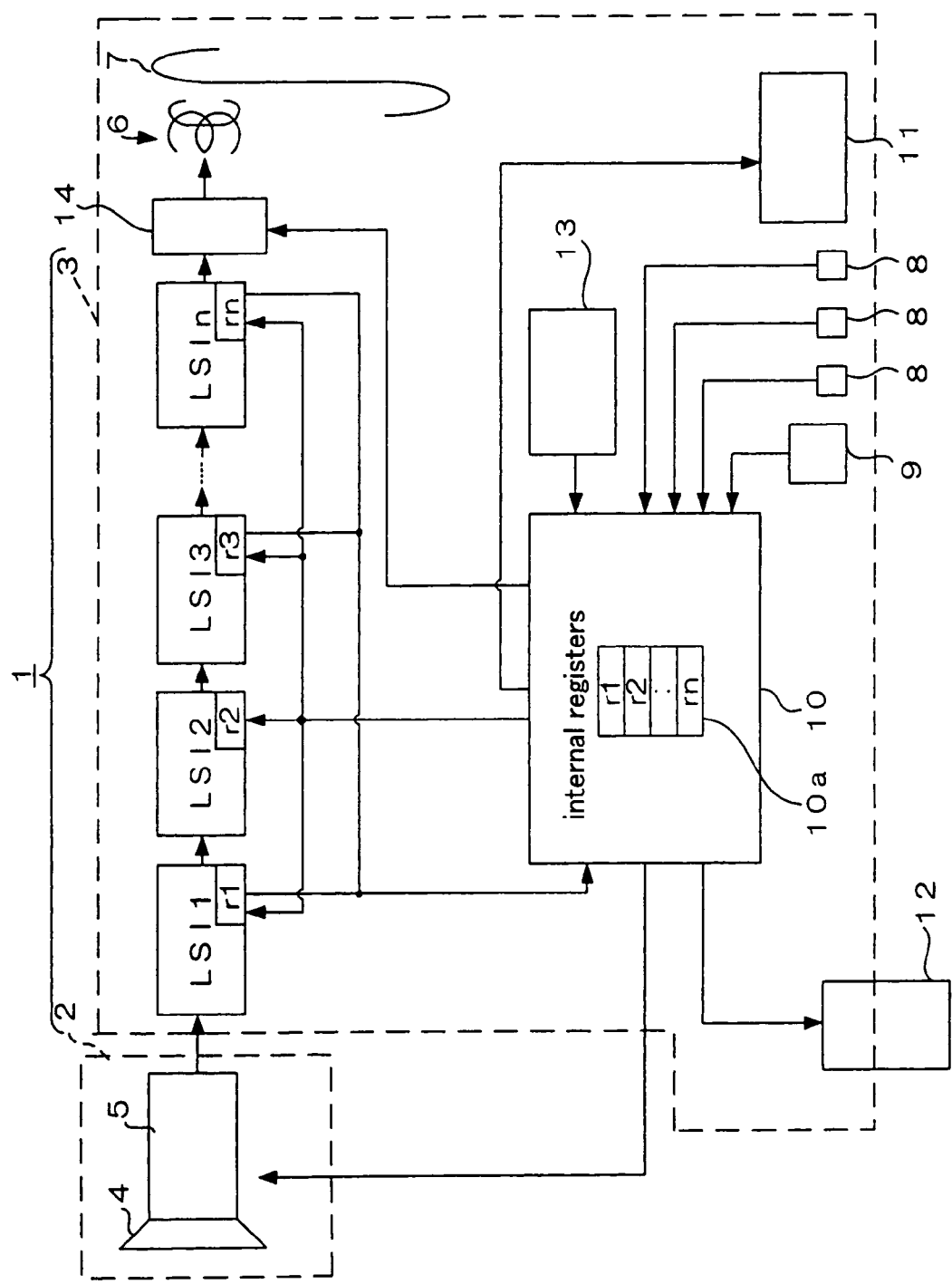
FIG. 1 is a block diagram illustrating a camera-built-in type VTR as an example of an information recording apparatus according to a preferred embodiment of the present invention.

Referring ring to FIG. 1, a numeral 1 illustrates the entire configuration of a camera-built-in type VTR as an example of an information recording apparatus according to a preferred embodiment of the present invention. The VTR 1 comprises an image taking unit 2 and a VTR unit 3.

The image taking unit 2 has a lens mechanism 4 for image shooting and a CCD 5 as a photoelectricity converter. Optical information entering from a photographic subject via the image-shooting lens mechanism 4 is converted by the CCD 5 into image signals.

The VTR unit 3 is described. The image signals from the CCD 5 are processed through a plurality of circuit elements LSI1-LSIn tandem-connected to one another as image signal processing units and recorded on a magnetic tape 7 as a magnetic recording medium via a recording head 6. The circuit elements LSI1-LSIn are comprised of semiconductor integrated circuits. The circuit elements LSI1-LSIn respectively implements signal processings, for example, shuffling, compression, variable-length coding, ECC coding, modulation, or the like, to the image signals from the CCD5 in compliance with signal processing modes set in registers r1-rn respectively incorporated in the circuit elements.

On required parts of the camera-built-in type VTR 1, such as side and frontal surfaces of an exterior case thereof, are provided a plurality of setting keys 8, a power switch 9 and the like, as artificial setting units for artificially setting a variety of modes, for example, gain adjustment, gamma correction, knee correction and the like. Signals from the respective setting keys 8 are inputted to a microcomputer 10. The microcomputer 10 controls operation when the power switch 9 is turned on.

The microcomputer 10 controls the circuit elements LSI1-LSIn and the like as a device for detecting, correcting and controlling recording abnormality. The microcomputer 10 outputs mode setting signals for setting the signal processing modes of the circuit elements LSI1-LSIn to the respective registers r1-rn in the circuit elements LSI1-LSIn. Further, the microcomputer 10 is capable of reading the signal-processing-mode data set in the respective registers r1-rn.

The microcomputer 10 comprises internal registers 10a functioning as devices to internally retain the mode setting signals outputted to the respective registers r1-rn of the circuit elements LSI1-LSIn as data. In the internal registers 10a are retained the same mode setting signals as the ones outputted to the respective registers r1-rn of the circuit elements LSI1-LSIn.

The camera-built-in type VTR 1 comprises, on the required parts such as the side surface of the exterior case thereof, an indicating unit 11 capable of indicating the respective signal processing modes and the like of the circuit elements LSI1-LSIn. The indicating unit 11 can indicate the signal processing modes and the like in response to control signals from the microcomputer 10.

The camera-built-in type VTR 1 comprises, on the required parts such as the side and frontal surfaces of the exterior case thereof, a card slot unit capable of mounting and detaching a memory card 12 memorizing a variety of modes at the time of image shooting. The camera-built-in type VTR 1 is thus configured in such manner that information relating to the respective modes from the memory card 12 can be inputted to the microcomputer 10 via the card slot unit.

The camera-built-in type VTR 1 comprises a timer 13. The timer 13 generates time information for recording time codes on the magnetic tape 7 as an information recording unit. The camera-built-in type VTR 1 is configured in such manner that outputs from the timer 13 are inputted to the microcomputer 10. Information recording units, other than the magnetic tape 7, include the recording head 6 and other recording devices not shown. The magnetic tape 7 is not an indispensable component in the camera-built-in type VTR 1 and is externally detachable.

The aspects of the present invention are hereinafter described.

The microcomputer 10 starts the operation control when the power switch 9 is turned on to thereby introduce electricity. The microcomputer 10, when starting the operation control, previously inputs the mode setting signals to the respective registers r1-rn so that the predetermined signal processing modes are set for the circuit elements LSI1-LSIn. In this manner, the circuit elements LSI1-LSIn respectively process the signals in the predetermined signal processing modes, and the camera-built-in type VTR 1, in response to the power introduction, is automatically set to an initial mode suitable for the image shooting. The initial mode is set, for example, based on the mode information memorized in the memory card 12 when the memory card 12 is installed in the card slot unit. Further, the camera-built-in type VTR 1, even after the power introduction, can be set to the respective modes for the signal processings at the time of image shooting when the setting keys 8 are artificially operated. Accordingly, the mode setting data altered according to the mode change is reflected on the internal registers 10a of the microcomputer 10.

Figure 2:
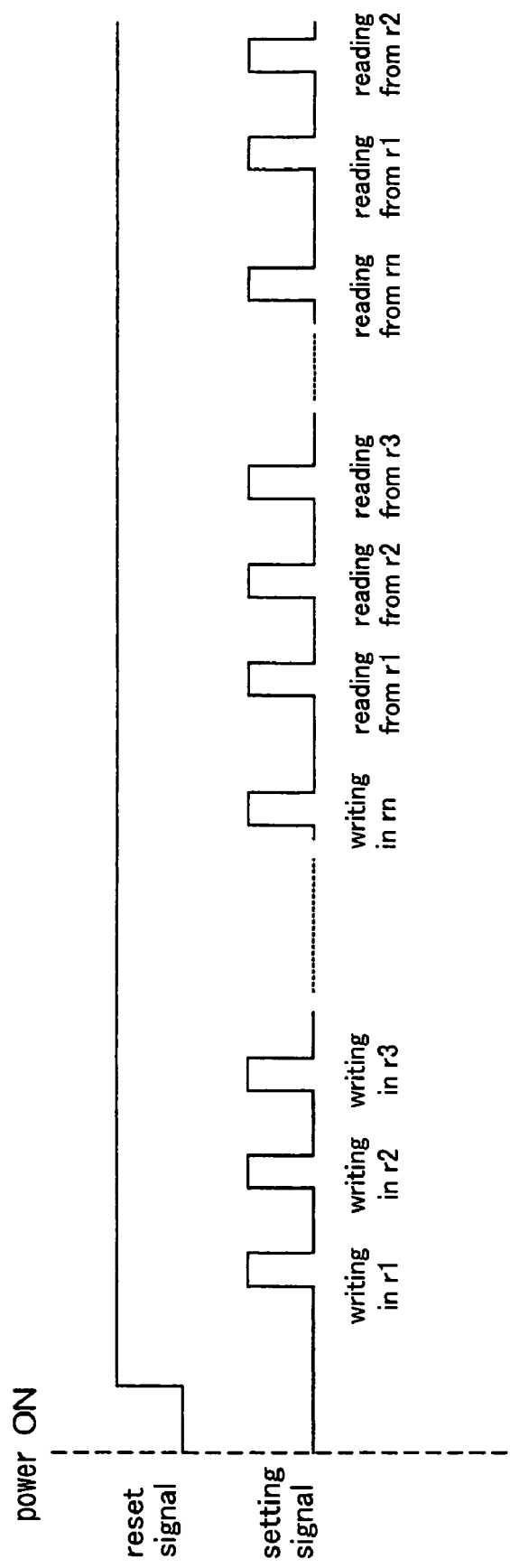
FIG. 2 is a timing chart relating to writing and reading of mode setting signals with respect to setting registers provided in circuit elements constituting image signal processing units.

Referring to FIG. 2, the microcomputer 10 writes the mode setting signals corresponding to the predetermined signal processing modes in the respective registers r1-rn of the circuit elements LSI1-LSIn and also writes the same mode setting signals in the internal registers 10a. The microcomputer 10 thereafter reads the mode setting signals in the respective registers r1-rn of the circuit elements LSI1-LSIn at predetermined time intervals and compares the read mode setting signals to the mode setting signals memorized in the internal registers 10a in order to judge whether or not the read mode setting signals are identical to mode setting signals set by a user.

In the case of the abnormality occurring in the signal processings due to disturbances or unstable start-up, the microcomputer 10, when judging that the mode setting signals in the respective registers r1-rn of the circuit elements LSI1-LSIn are different to the mode setting signals in the internal registers 10a, superposes the reference numbers of the corresponding registers r1-rn, the normal mode setting signals retained in the internal registers 10a, and the abnormal mode setting signals by means of an information superposing device 14 shown in FIG. 14 to thereby record the superposed signals in a blank recording region of the magnetic tape 7 via the recording head 6.

According to the recording process as described, the magnetic tape 7 contains the time codes, recording date and time, setting keys 8 operated by the user, operation detail and time of the power switch 9 at that time. Therefore, the user can know the time of the occurrence or possible occurrence of the recording abnormality as the actual time.

The user, when acknowledging that the image signals recorded on the magnetic tape involve any abnormality from observing reproduced image after the image shooting, analyzes the causes of the abnormality. In implementing the analysis, the user reads the details of the setting data recorded on the magnetic tape 7, which caused the recording abnormality, and analyzes the time of the occurrence of the recording abnormality in the image shooting and if the recording abnormality is caused by the disturbances or the like or some abnormality in the mode change resulting from the artificial operation of the setting keys 8 and power switch 9.

The camera-built-in type VTR 1 may be configured in the following manner. When the recording abnormality occurs, the microcomputer 10, instead of only recording the recording abnormality itself on the magnetic tape 7, records the recording abnormality information on the magnetic tape 7 as described. Further, the microcomputer 10 resets data so as to be automatically suitable to the modes at that time with respect to the abnormality-confirmed circuit elements LSI1-LSIn, which are thereafter restored to the normal state so that the image shooting is restarted.

In the foregoing embodiment, the cases of the abnormal recording and possible abnormal recording with respect to the image signals were described. Audio signals, other than the image signals, may also be handled in the same manner, that is the occurrence or possible occurrence of the recording abnormality is recorded, together with the actual time, operation information, and setting data in the circuits causing the recording abnormality, in the blank recording region of the magnetic tape 7. The circuit elements LSI1-LSIn are then configured including the signal processings for the audio signals.

As described, the detection result of the abnormality in the circuit elements LSI1-LSIn, the switch operation by the user, power-supply voltage, temperature, and the like at the time of the occurrence of the recording abnormality are linked with the image and sound to be subsequently recorded, together with the identical time, that is the actual time information, in the blank recording region of the magnetic tape 7. The causes of the recording abnormality can be thus more simply analyzed.

Further, the microcomputer 10 may be configured in such manner as indicating the occurrence of the recording abnormality in the indicating unit 11 as an error message so that the user in charge of the image shooting can know the occurrence therefrom. Thus, the user can be warned of the recording abnormality.

According to the camera-built-in type VTR 1 configured in the foregoing manner, the details of the recording abnormality recorded on the magnetic tape 7 are analyzed, thereby resulting in less frequency in inquiring of the user for the situation of the occurrence of the recording abnormality. This reduces the user's burden, and further, improves the accuracy of the analysis of the causes and reduces time required for the analysis. Thus, the user can receive quick feedback and response.

Moreover, in the foregoing manner, the analysis only requires the magnetic tape recorded in the recording abnormality state, thereby dispensing with the information recording apparatus undergoing the recording abnormality itself. It therefore becomes less necessary to provide an alternative information recording apparatus and the transportation cost of the apparatus can be saved.

Further, it becomes unnecessary to provide an exclusive abnormality detecting circuit for detecting the occurrence of the recording abnormality, thereby eliminating any cost increase. Thus, the recording abnormality can be detected at a reasonable cost.

The foregoing embodiment described the apparatus capable of recording both of the recording abnormality caused by the signal processing abnormality due to the disturbances and the recording abnormality caused by the abnormality in the mode change resulting from the operation of the setting keys on the magnetic recording medium as the recording abnormality information. The apparatus, however, may comprise only one of the foregoing functions.

In the foregoing embodiment, the setting keys 8 capable of setting the modes of gain adjustment, gamma correction, knee correction and the like were described. The setting keys 8 further includes AWB correction and the like, and the settings by anode-setting switch for remote-controlled image shooting, pause setting switch, switch-on-screen menu for the operation of fast forward and reverse feed.

The foregoing embodiment described the apparatus capable of indicating the occurrence of the recording abnormality as a warning via the indicating unit 11. The warning may be issued in sound, and the recording abnormality may be informed by flashing a tally light for informing the recording state.

The foregoing embodiment described the camera-built-in type VTR, however, the information recording apparatus is not limited to such. Accordingly, the information for recording is limited neither to the image signals nor audio signals.

In the foregoing embodiment, the magnetic tape was used for the recording medium as an example of the magnetic recording medium, however the recording medium is not limited to the magnetic recording medium such as the magnetic tape. The usable recording media includes a memory card, memory elements such as non-volatile RAM incorporated in a main body of the VTR, and an optical recording medium such as an optical disk and the like.

The apparatus may also be configured in such manner that a memory IC capable of transmitting and receiving the signals to and from outside is mounted inside, on a surface or in a housing case of the magnetic recording medium such as a cassette tape, and the information relating to the recording abnormality is associated with the image signals and time codes which are recorded on the magnetic recording medium to be thereby recorded on the memory IC.

The foregoing embodiment was described in the case of the VTR unit 3, however the embodiment may be applied to signal processing units in a camera unit 2 in the same manner.

In the foregoing embodiment, the microcomputer 10 has, inside thereof, the internal registers 10a for retaining the mode setting signals, however, a memory for retaining the mode setting signals may be provided outside the microcomputer 10.

According to the information recording apparatus configured in the foregoing manner, when the recording abnormality may possibly occur or is already occurring, the information relating to the recording abnormality is recorded on the magnetic recording medium. Therefore, when the causes of recording abnormality are analyzed, the mode setting signals and the user's operation details recorded on the magnetic recording medium, which are the causes of the recording abnormality, are analyzed. In this manner, for example, the time of the occurrence of the recording abnormality, which circuit is involved in the recording abnormality, which operation is the cause of the recording abnormality, and the like, can be simply and quickly analyzed.

Further, the analysis of the recording abnormality only requires the magnetic recording medium, which makes it less necessary to analyze the information recording apparatus. The apparatus, therefore, can be more possibly utilized during the analysis.

INDUSTRIAL APPLICABILITY

The present invention can be applied to a method of an information recording apparatus capable of recording information that is image information or the like on a recording medium such as a magnetic tape, an example of which is a camera-built-in type VTR.

The invention claimed is:
1. An information recording apparatus comprising:
a plurality of signal processing units connected in series, wherein
each signal processing unit
comprises one or more mode-setting registers,
receives an input signal, and
processes the input signal in accordance with a value of the mode-setting registers to generate an output signal,
a first signal processing unit receives the output signal generated by a second signal processing unit,
information recording units,
the information recording units recording on a recording medium the output signal generated by the first signal processing unit; and
a microcomputer,
the microcomputer judging if the signal processing units are subject to recording abnormality or already undergoing the recording abnormality, and
the microcomputer further recording information relating to the recording abnormality on an abnormality information recording medium together with actual time information in response to the judgment for the recording abnormality,
the microcomputer has internal registers and sets first mode setting signals with respect to the mode-setting registers of the signal processing units while retaining second mode setting signals identical to the first mode setting signals in the internal registers, and
the microcomputer further judges if the signal processing units are subject to the recording abnormality or already undergoing the recording abnormality by comparing the first and second mode setting signals and records the information relating to the recording abnormality on the abnormality information recording medium together with the actual time information when the recording abnormality is judged to occur.

2. An information recording apparatus as claimed in claim 1, wherein
each of the signal processing units receives an image signal as the input signal.

3. An information recording apparatus as claimed in claim 1, wherein
the microcomputer detects causes of the occurrence of the recording abnormality per circuit element constituting the signal processing units and records the causes of the occurrence on the abnormality information recording medium.

4. An information recording apparatus comprising:
a plurality of signal processing units connected in series, wherein
each signal processing unit
comprises a plurality of circuit elements and one or more mode-setting registers,
receives an input signal, and
processes the input signal in accordance with a value of the mode-setting registers to generate an output signal,
a first signal processing unit receives the output signal generated by a second signal processing unit;
information recording units,
the information recording units recording on a recording medium the output signal generated by the first signal processing unit; and
a microcomputer,
the microcomputer judging if the signal processing units are subject to recording abnormality or already undergoing the recording abnormality, and
the microcomputer further recording information relating to the recording abnormality on an abnormality information recording medium together with actual time information in response to the judgment for the recording abnormality, wherein the microcomputer has internal registers respectively corresponding to the mode-setting registers and sets first mode setting signals in each of the mode-setting registers in the circuit elements while retaining second mode setting signals identical to the first mode setting signals in the respective internal registers, and the microcomputer further judges if the respective circuit elements are subject to the recording abnormality or already undergoing the recording abnormality by comparing the respective first and second mode setting signals and records the information relating to the recording abnormality on the abnormality information recording medium together with the actual time information when the recording abnormality is judged to occur.

5. An information recording apparatus as claimed in claim 3, further comprising:

artificial setting units that artificially set signal processing modes for the signal processing units, wherein the microcomputer records setting operation information of the artificial setting units on the abnormality information recording medium together with actual time for the operation and inputs the first mode setting signals in the mode-setting registers in the the signal processing units in compliance with the signal processing modes of the artificial setting units.

6. An information recording apparatus as claimed in claim 5, wherein the microcomputer monitors judgments based on comparison of the first mode setting signals and the second mode setting signals at predetermined time intervals, and the microcomputer further records details of mode setting signals and setting operation information of the artificial setting units, which are the causes of the recording abnormality, on the abnormality information recording medium together with the actual time information.

7. An information recording apparatus as claimed in claim 1, wherein an indicating unit is comprised, the indicating unit indicating the state of the recording abnormality in response to the control of the microcomputer.

8. An information recording apparatus as claimed in claim 1, wherein the abnormality information recording medium is a magnetic recording medium.

9. An information recording apparatus as claimed in claim 7, wherein the magnetic recording medium is a magnetic tape.

10. An information recording apparatus as claimed in claim 1, wherein the recording medium and the abnormality information recording medium are identical, and the information relating to the recording abnormality is recorded in a blank region of the recording medium.

11. An information recording apparatus as claimed in claim 1, wherein the recording medium constitutes a mobile type recording medium with a sealed main body of the recording medium incorporated therein, and the abnormality information recording medium is an auxiliary recording medium installed in the mobile type recording medium besides the main body of the normal information recording medium.

12. An information recording apparatus as claimed in claim 10, wherein the recording medium is a mobile type recording medium of a cartridge type with a sealed main body of a magnetic recording medium incorporated therein, and the auxiliary recording medium is a semiconductor memory installed in the mobile type recording medium.

13. An information recording apparatus comprising:

an image taking unit, the image taking unit having a lens mechanism for image shooting and a photoelectricity converter, and the image taking unit further converting optical information entering from a photographic subject via the image-shooting lens mechanism by means of the photoelectricity converter into image signals to thereby output the image signals; and a VTR unit having:

a plurality of signal processing units connected in series, wherein each signal processing unit
comprises one or more mode-setting registers,
receives input image signals, and
processes the input image signals in accordance with a value of the mode-setting registers to generate output image signals, a signal processing unit receives the image signals output by the image taking unit, and a first signal processing element receives output image signals generated by a second signal processing unit;

information recording units, the information recording units recording on a recording medium the output image signals generated by the first signal processing unit; and a microcomputer, the microcomputer judging if the signal processing units are subject to recording abnormality or already undergoing the recording abnormality and recording information relating to the recording abnormality on the recording medium together with actual time information in response to the judgment for the recording abnormality, wherein the microcomputer has internal registers and sets first mode setting signals with respect to the mode-setting registers of the signal processing units while retaining second mode setting signals identical to the first mode setting signals in the internal registers, and the microcomputer further judges if the signal processing units are subject to the recording abnormality or already undergoing the recording abnormality by comparing the first and second mode setting signals and records the information relating to the recording abnormality on the abnormality information recording medium together with the actual time information when the recording abnormality is judged to occur.

14. An information recording apparatus comprising:

an image taking unit, the image taking unit having a lens mechanism for image shooting and a photoelectricity converter, and the image taking unit further converting optical information entering from a photographic subject via the image-shooting lens mechanism by means of the photo electricity converter into image signals to thereby output the image signals; and a VTR unit having:

a plurality of signal processing units connected in series, wherein each signal processing unit comprises a plurality of circuit elements and one or more mode-setting registers, receives input image signals, and processes the input image signals in accordance with a value of the mode-setting registers to generate output image signals, a signal processing unit receives the image signals output by the image taking unit, and a first signal processing unit receives output image signals generated by a second signal processing unit;

information recording units, the information recording units recording on a recording medium the output image signals generated by the first signal processing unit; and a microcomputer, the microcomputer judging if the signal processing units are subject to recording abnormality or already undergoing the recording abnormality and recording information relating to the recording abnormality on the recording medium together with actual time information in response to the judgment for the recording abnormality, wherein the microcomputer has internal registers respectively corresponding to the mode-setting registers and sets first mode setting signals in each of the mode-setting registers while retaining second mode setting signals identical to the first mode setting signals in the respective internal registers, and, the microcomputer further judges if the respective circuit elements are subject to the recording abnormality or already undergoing the recording abnormality by comparing the respective first and second mode setting signals and records the information relating to the recording abnormality on the abnormality information recording medium together with the actual time information when the recording abnormality is judged to occur.

15. A video recording apparatus comprising:

an image taking unit which outputs a captured video signal;

a plurality of signal processing elements connected in series, wherein each signal processing element comprises one or more mode-setting registers, receives an input video signal, and processes the input video signal in accordance with a value of the mode-setting registers to generate an output video signal, a signal processing element receives the captured video signal, and a first signal processing element receives the output video signal generated by a second signal processing element;

an information recording unit for storing on a recording medium the output video signal generated by the first signal processing element; and a microcomputer which stores a plurality of expected values each corresponding to a mode-setting register of the video processing unit, outputs the expected values to the mode-setting registers, inputs current values from the mode-setting registers, compares the current values and the expected values to determine an occurrence of a recording abnormality, generates a recording abnormality information corresponding the recording anomaly based on the current values, and stores in an abnormality recording medium the recording abnormality information together with a time of the recording abnormality.

16. An information recording apparatus comprising:

a plurality of signal processing units connected in series, wherein each signal processing unit comprises a plurality of circuit elements and one or more mode-setting registers for memorizing mode setting signals set per circuit element, receives an input signal, and processes the input signal in accordance with a value of the mode-setting registers to generate an output signal, a first signal processing unit receives the output signal generated by a second signal processing unit;

information recording units recording on a recording medium the output signal generated by the first signal processing unit; and a microcomputer, the microcomputer detecting a recording abnormality that is expected to occur or has already occurred at the signal processing units and ascertaining causes of the abnormality per circuit element, and the microcomputer further recording information relating to the recording abnormality on an abnormality information recording medium together with actual time information in response to the detection of the recording abnormality, wherein the microcomputer has internal registers and sets first mode setting signals with respect to the mode-setting registers of the signal processing units while retaining second mode setting signals identical to the first mode setting signals in the internal registers;

the microcomputer monitors the first mode setting signals at predetermined time intervals;

the microcomputer further detects the recording abnormality that is expected to occur or has already occurred at the signal processing units by comparing the first and second mode setting signals;

the microcomputer records the information relating to the recording abnormality on the abnormality information recording medium together with the actual time information when the recording abnormality is detected; and the microcomputer resets the circuit element where abnormality is detected based on the second mode setting signal, thereby permitting the signal processing unit to return to a normal condition to resume normal processing.

* * * * *

UNITED STATES PATENT AND TRADEMARK OFFICE
CERTIFICATE OF CORRECTION

PATENT NO. : 7,599,608 B2
APPLICATION NO. : 10/496070
DATED : October 6, 2009
INVENTOR(S) : Shinji Takemoto et al.

It is certified that error appears in the above-identified patent and that said Letters Patent is hereby corrected as shown below:

Title Page

In Item "(56) References Cited," under "Foreign Patent Documents,"

Please change the publication date of the reference "JP 10-13790 A" from "01/1997" to --1/1998--.

Signed and Sealed this

Eleventh Day of May, 2010

David J. Kappos
*Director of the United States Patent and Trademark Office*